Dec. 31, 1935.        G. F. STORM        2,026,511
FLOOR AND PROCESS OF LAYING THE SAME
Filed May 14, 1934        3 Sheets-Sheet 1
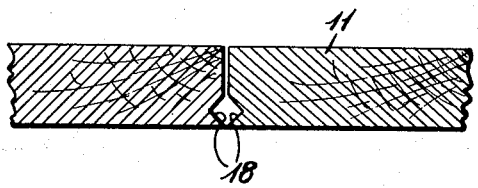
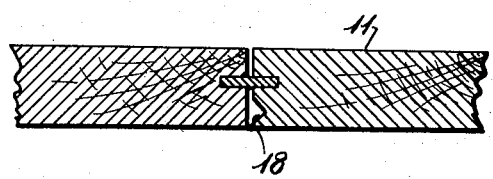
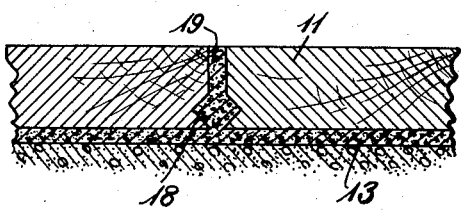
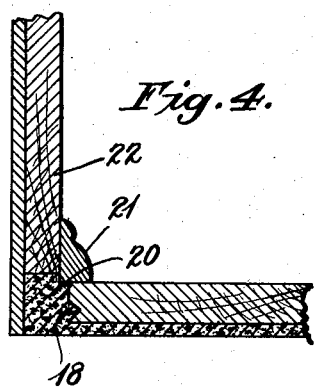
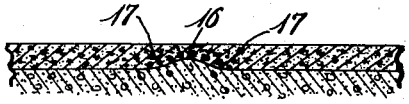
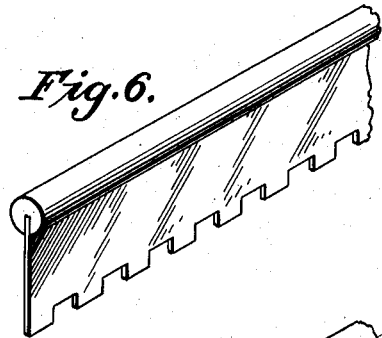
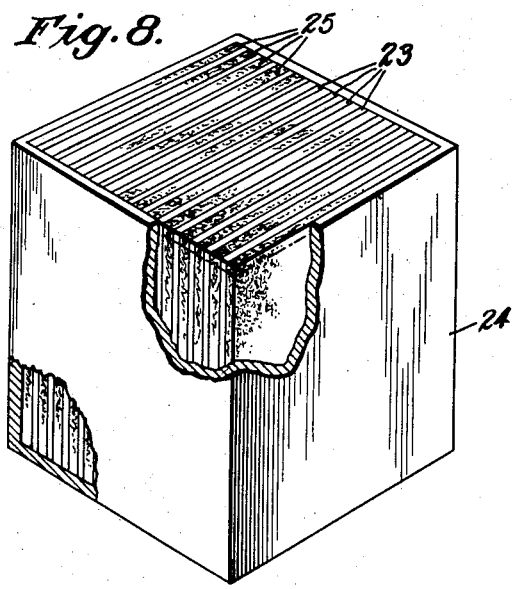
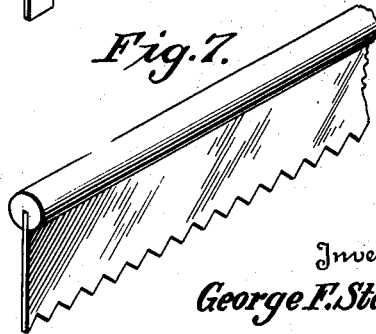
Inventor
George F. Storm
By Browne & Phelps
Attorneys Dec. 31, 1935.　　　　　G. F. STORM　　　　　2,026,511
FLOOR AND PROCESS OF LAYING THE SAME
Filed May 14, 1934　　　3 Sheets-Sheet 2

Inventor
George F. Storm
By Browne & Phelps
Attorneys

Dec. 31, 1935.  G. F. STORM  2,026,511
FLOOR AND PROCESS OF LAYING THE SAME
Filed May 14, 1934  3 Sheets-Sheet 3

Inventor
George F. Storm
By Brown & Phelps
Attorneys

Patented Dec. 31, 1935

2,026,511

UNITED STATES PATENT OFFICE 2,026,511

FLOOR AND PROCESS OF LAYING THE SAME

George Freeman Storm, Pelham Manor, N. Y.

Application May 14, 1934, Serial No. 725,599

10 Claims. (Cl. 20—7)

The invention relates to flooring and has as an object the provision of a process of laying a floor and of the floor resulting from the carrying out of the process.

It is an object of the invention to provide a floor laid in mastic, which floor will be cushioned so as to provide resilience and prevent squeaking of the floor in use, and to provide insulation against heat and sound.

It is a further object of the invention to provide a cushioned floor wherein the cushioning material is a layer of resilient material combined with asphalt or other permanently ductile adhesive.

It is a further object of the invention to provide a floor having conduits to receive electric wiring formed by grooves in the lower surface of the flooring material.

It is a further object of the invention to provide a floor provided with a cushioning layer formed of asphalt or the like mixed with granulated or shredded cushioning material which may be troweled into place.

It is a further object of the invention to provide a floor laid upon an adhesive cushioning mastic which serves both as a cushioning layer and as an adhesive layer to provide essentially the only means of fastening the floor down upon the subfloor.

It is a further object of the invention to provide a floor having a structure especially adapted to coact with the mastic of the invention.

It is a further object of the invention to provide a novel method of packaging one form of the cushioning material of the invention.

Further objects of the invention will appear from the following description when read in connection with the accompanying drawings showing illustrative embodiments of the invention, and wherein:—

Fig. 1 is a detail vertical transverse section of two meeting elements of a floor embodying a feature of the invention;

Fig. 2 is a like view of a modified form;

Fig. 3 is a like view showing an expansion joint between the elements;

Fig. 4 is a like view showing an expansion space at an edge of a floor panel;

Fig. 5 is a detail vertical section illustrating the coaction of the mastic of the invention with an irregularity of the subfloor;

Figs. 6 and 7 are perspective views of old forms of trowels to be used in applying the mastic to the base;

Fig. 8 is a perspective view partly broken away of an opened receptacle with one form of the cushioning material packaged therein;

Figure 9:
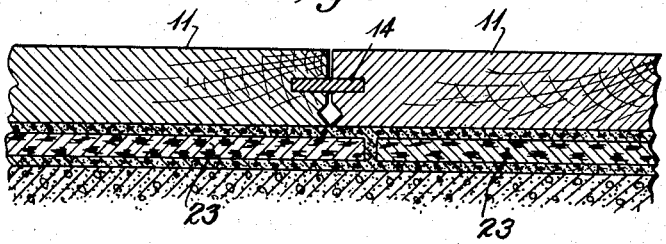
Fig. 9 is a view similar to Figs. 1 and 2 showing sheet cushioning material in place.

It has become a very common practice to lay floors as wood strips or blocks in mastic, which floors require no nailing to the subfloor. In practice it is found that floors so laid are unpleasantly lacking in resilience to the tread of the user even though the mastic is laid as thick as practicable, which makes the floors hard upon the users, approaching the effect of walking on concrete which is notably tiring because of the shocks to the person walking thereon. Many forms of floors have been devised to overcome this difficulty which, so far as I am aware, have taken the form of laying a thick layer of some cushioning material under the floor, which practice is expensive of construction and which objectionably builds up the thickness of the floor.

In accordance with the present invention, a floor is provided which is little more expensive than the ordinary mastic-laid floors and which is pleasantly resilient and quiet in use. In accordance with the invention asphalt or an equivalent form of adhesive is combined with resilient material as granulated or shredded cork to provide a cushioning adhesive layer which is laid upon the floor. The adhesive content of the material is so chosen as to provide a material in which the floor may be bedded and to which it will adhere.

In one form of the invention a resilient sheet of material may be packed in containers embedded in asphalt or the like which may be softened by warming or may be mixed with a usual "cut-back", which containers, when the material is desired for use, are opened and the sheet material withdrawn and spread upon the floor to which it will adhere and to which in turn the flooring will adhere when bedded thereon by virtue of the coating of mastic carried by the sheets from the container.

In another and preferred form of the invention, shredded or granulated cork is mixed with adhesive of such consistency that it will be of troweling consistency, a layer of which is spread upon the floor and the flooring material is then applied thereto and thus caused to adhere to the floor. It is found that a $\frac{1}{16}$ to $\frac{3}{32}$ inch layer of this material provides an excellent adhesive and cushioning layer.

In experiments it is found that while an excellent floor is produced by a cushioning material, as granulated cork, combined with asphalt of proper consistency alone, yet such form of mastic is difficult to apply. It has been customary for years to use a spreading trowel of one of the forms of Figs. 6 and 7. In spreading the mastic the material escapes from ahead of the trowel, between its teeth and is thereby spread at the desired thickness in the form of striations which promptly flow together or are flattened by application of the flooring.

In the spreading of the mastic of the invention with such a trowel, it is found that if only cut-back or hot asphalt is used with the cushioning material, the latter is raked or rolled out of the body of the mastic by the trowel. To avoid this difficulty, the invention includes the addition of fiber to the asphalt and cushioning material which may be asbestos fiber, cellulose fibers or the like. The fibers are found to enmesh the granules of cork when cork is used and to obviate objectionable separation thereof in troweling. Obviously, small quantities of powder as of mica, dry pulverized slate or the like may be added, as is common, which if not too much is used will not interfere with the adhesion or cohesion of the material.

It is important that the cushioning material be such as will not absorb the hydrocarbons of the mastic since if the cushioning material becomes saturated, its resilience will be deadened. Cork is such a material and at present prices is preferred. The cork may be granulated or shredded. Where "comminuted" is recited in the claims, it is to be understood that shredded cork or any other cushioning material having the qualities above described is to be taken as a mechanical equivalent.

Where the traffic is such that a thicker cushioning layer is desired, excellent results are secured by placing a layer of the cushioning material, of say $\frac{3}{32}$ of an inch thickness and containing from 60% to 75% resilient material as granulated or shredded cork. This layer is then allowed to partially cure for say forty-eight hours, after which a second coat having only substantially 30% of the cushioning material, and of a thickness to build the cushioning layer to substantially $\frac{1}{8}$ of an inch in thickness, is applied upon which the flooring is immediately placed.

One objection to mastic laid flooring has been that the thin flooring elements have made it necessary to provide for electric wiring conduits in the subfloor which generally is concrete and the formation of conduits in which has been rather an expensive proceeding.

In accordance with the present invention and because of the cushioning nature of the adhesive layer, it is possible to provide wiring conduits by forming grooves as 10 in the lower surface of certain flooring elements 11 shown as adhered to the subfloor 12 by virtue of the cushioning layer 13 above described.

The mastic layer is an excellent insulator, whether it contains the cushion ingredient or not, and therefore ordinary insulated wires may be run in the conduits provided by the grooves without the use of BX conduits or BX covered cables, where inspection requirements will permit.

Because of the cushioning layer, pressure of foot traffic upon the elements 11 will not deleteriously press the cable 15 against the rigid subfloor. The use of such conduits is made more convenient when the elements of the floor of the invention are secured together by metal splines 14. The metal splines being thinner than the ordinary tongues and grooves applied to flooring blocks or strips, the grooves 10 may pass completely below the splines and thus not weaken the union between the flooring elements.

The floor having elements provided with the grooves laid in alignment may be put down to provide the empty conduits, or empty metallic conduits may be placed in the grooves as laid, into which the conductors may be "fished" later in accordance with usual practice. An outlet in the surface of the floor is shown at 32.

Suitable adhesive materials are asphalt, bituminous material derived from coal tar or any material having the desired adhesive qualities and which will remain ductile in use as distinguished from adhesive that hardens upon standing, as glue.

In the spreading of the usual mastic, rendered thickly fluid either by heat or by a solvent, or by emulsification with water, it has been found that in the case of an upwardly projecting irregularity as 16, Fig. 5, the mastic will flow to a common level, in some cases leaving the crest of the hill bare for rigid contact with the flooring. When the mastic of the invention is used, the troweling causes the cushioning material to collect at the base of the hill as at 17, thus checking the flow and leaving the crest covered.

It has long been the practice to provide mastic grooves between the elements of a block and between the blocks for mastic relief in laying the blocks and to key the flooring with the mastic. A form of grooves having a different coaction with any mastic and a special coaction with the mastic of the present invention is shown in Figs. 1, 2, 9, and 10. As there shown a groove 18 is formed at edges of the flooring elements, which groove is so formed as to leave the bottom of the element with the same, or substantially the same, superficial area as upper surface thereof. In other words, the lower edges of the grooves are substantially in contact when the elements are assembled in a block or in the floor. Either in laying or by subsequent use some mastic finds access to the grooves which particularly when "cold" mastic is used, is thickened by escape of volatiles upward through the joint and, since pressure of the mastic under the floor is partially shut off by the meeting edges, tends to seal the grooves against seeping of mastic to the surface.

When this form of groove is used with the cushion mastic of the invention, the initial seepage of the hydrocarbon of the mastic into the groove will promptly bring some of the cushioning material against the bottom of the meeting edges thereby damming the joint against entry of more of the hydrocarbon.

Figure 13:
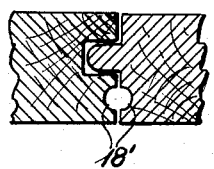
Fig. 13 and 14 are detail sections similar to Figs. 1 and 2 showing different forms of elements.

The grooves of the invention may be used with integral tongues and grooves, as shown in Fig. 13, or with the "loose spline" of Fig. 2. However by virtue of the new form of groove it is entirely practicable to use the form of Fig. 1. Since when using integral tongued and grooved flooring, one-fourth must be figured for waste in matching, which waste is hereby avoided, a great saving of material results from this form of the invention.

Figure 10:
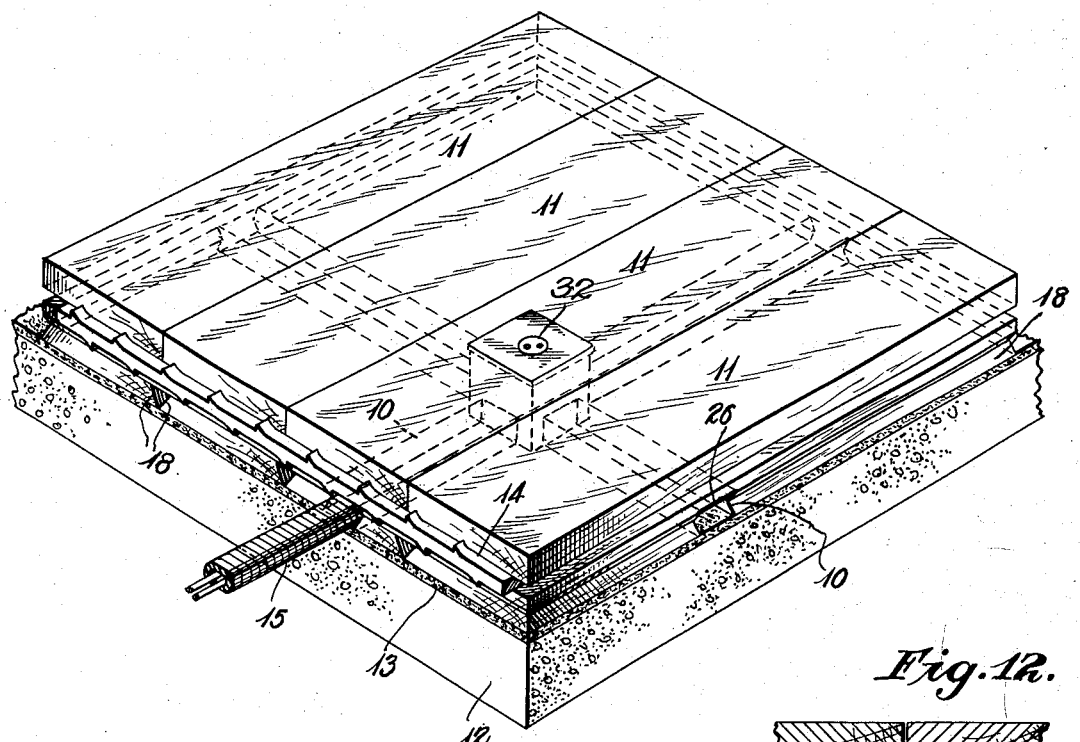
Fig. 10 is a detail perspective view with the base in section, showing one form of the floor of the invention.

The grooved flooring of the invention may be used with floor elements separately laid in mastic in which use the grooves will have the usual function of mastic relief grooves while being laid and after laying will function as above described. However the maximum value is had when used between the elements of preassembled units in block as illustrated in Fig. 10, or in preassembled panels of any form, as at 27, Fig. 16.

When so used the groove or meeting grooves will provide substantially closed recesses between the elements into which some mastic will find access since it is impossible to make a joint sufficiently tight to entirely exclude the mastic. The small amount that does enter will "set" and resist the entry of more as described above.

When the cushion mastic of the invention is used with this form of groove the exclusion is furthered so that no mastic can reach the surface of the floor whether tongue and groove joints are used or not between the elements.

The mastic of the invention provides an excellent material for expansion joints either between some elements of the floor, as at 19, Fig. 3, or at edges of the floor as at 20, Fig. 4. In the latter case the shoe mould 21 is shown as covering a portion of the expansion joint which extends below the baseboard 22.

In Fig. 9 is shown the sheet form of the cushioning material. In using this form the sheets 23 are packaged at the factory loosely in a container 24 and embedded in the container in asphalt or the like 25. At the job the top of the container is cut away and using any suitable tweezers or pliers, the sheets are drawn out, carrying on both sides a sufficient coating of mastic to adhere to the base and to cause adherence of the floor elements when the sheets are assembled on the base.

As will be seen in Fig. 9, the sheets 23 are assembled with small spaces between adjacent edges. The mastic squeezed from beneath the sheets and the surplus mastic flowing from the upper surfaces of the sheets fill these spaces. It is found in practice that these mastic filled spaces, existing as intersecting ribs of mastic extending in both directions of the floor panel, forming a grid of mastic ribs with the spaces of the grid filled with the sheets of cushioning material, have a distinct advantage. The ribs act as deadeners to lessen vibration of the floor in a manner wholly unexpected until observed in practice.

To prevent nails being driven into the floor and into the cables 15 in the conduits 10, the upper surfaces of the conduits are shown as provided with armor strips 26 of steel or the like. The armor strips may be placed into the grooves in transversely bowed form and then flattened to cause their edges to penetrate the material at the bases of the grooves, or may be driven tightly into place from the edge of the strip block or panel.

Figure 12:
Fig. 12 is a detail vertical transverse section showing a modified form of groove at present preferred.
Figure 11:
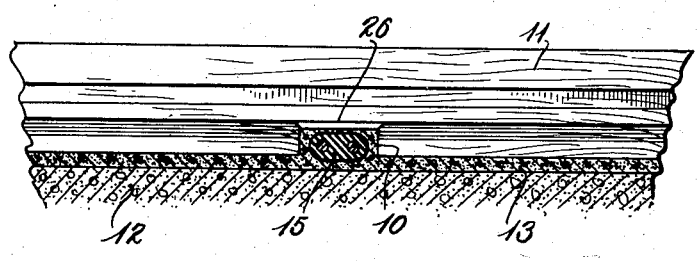
Fig. 11 is a detail edge view of a portion of the structure of Fig. 10.

The form of mastic groove of Fig. 12 shown at 18' is found in use to have desirable features. In this form the groove in the blocks is shown as semi-circular and as being spaced from the bottom surface, leaving a narrow vertical portion adjacent said bottom surface. The abutment thus provided at the lower edge of the blocks serves to balance the blocks when they expand and tends to prevent upward buckling of blocks at the joint. It is to be understood that this groove extends, as in the other forms, continuously around all edges of each strip so as to provide also a groove at all meeting edges of blocks as well as between the slats of the blocks themselves. Each strip in each block is therefore milled like every other strip and no milling is required after the blocks are assembled.

Figure 14:
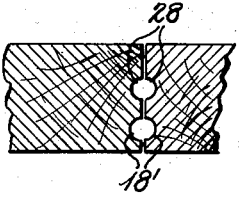

To provide further security against mastic coming to the surface, when using square edged elements, an additional mastic trap 28 is shown in Fig. 14 desirably located, as shown, midway of the thickness of the floor elements.

It is well understood in the art that an essential element is the adhesive power of the mastic while subjected to stresses imposed by movement of the floor surface caused by expansion or contraction, particularly expansion. In the mastic of the present invention a substantial proportion is made up of the resilient material and the adhesion is therefore somewhat less than that of the ordinary mastic. It therefore becomes important to divide up any movement of the floor surface to lessen the movement of any particular portion thereof.

Figure 15:
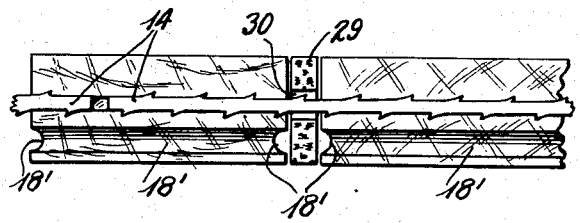
Fig. 15 is a detail end view of adjacent elements joined by a spline with an expansion joint filler therebetween.
Figure 16:
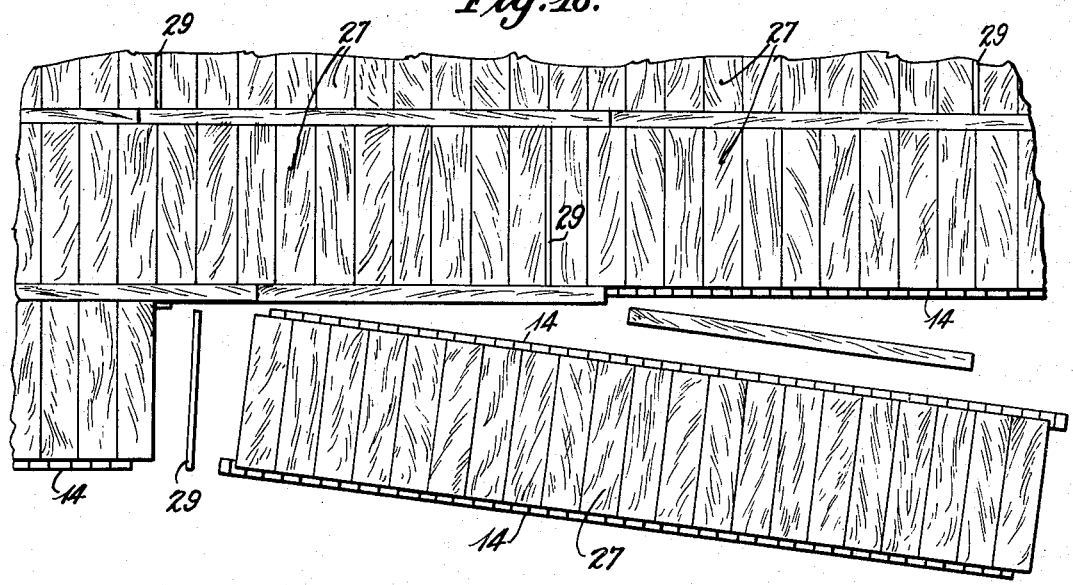
Fig. 16 is a detail expanded plan view showing partially assembled elements of a form of flooring which may be laid in the mastic of the invention to secure valuable results.
Figure 17:
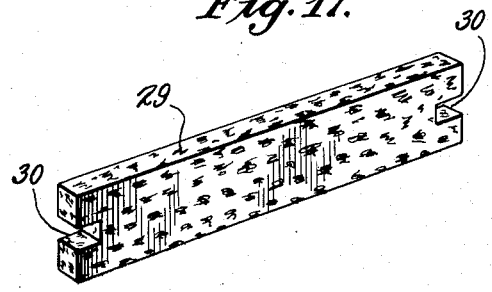
Fig. 17 is a perspective view of an expansion joint element of the invention.

To this end the form of expansion joint illustrated in Figs. 15–18 is provided by the invention. A perspective view of the element 29 of Figs. 15 and 16, is shown in Fig. 17. The body 29, formed of an especially resilient and compressible cork composition, is provided with notches 30 in its ends to be engaged by the splines whereby to retain the body in the joint. When the body 29 is assembled with the "panel" 27 of Fig. 16, the splines 14 will engage the notches 30 and prevent the bodies 29 from rising. Any movement of the floor element on the mastic, due to expansion, will be divided up by the expansion joints, thereby lessening liability of rupture of the mastic.

Figure 18:
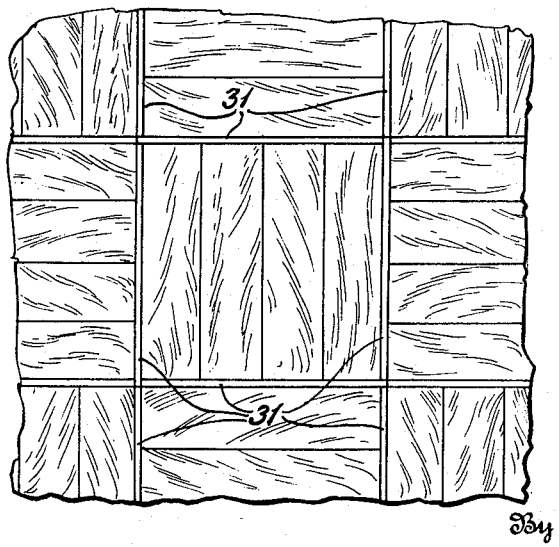
Fig. 18 is a detail plan view of a form of block floor having expansion elements to coact with the mastic of the invention.

In Fig. 18 bodies 31 are shown surrounding each block thereby providing for individual expansion of the blocks and preventing any movement of a block as a whole as well as providing an ornamental design in the floor by contrast between the blocks and the expansion joint material.

Minor changes may be made in the physical embodiments of the invention within the scope of the appended claims without departing from the spirit thereof.

I claim:

1. A cushioned floor comprising, in combination: a subfloor; an adhesive cushioning layer comprising a combination of permanently ductile adhesive with resilient material and fiber, adhering to said subfloor; and assembled floor elements superposed upon and adhering to said cushion layer.

2. A cushioned floor comprising, in combination: a subfloor; an adhesive cushioning layer comprising a mixture of permanently ductile adhesive material with comminuted cushioning material and fiber, adhering to said subfloor; and assembled floor elements superposed upon and adhering to said cushion layer.

3. A cushioned floor comprising, in combination: a subfloor; an adhesive cushioning layer comprising a mixture of comminuted cord, fiber, and permanently ductile asphalt adhered to said subfloor; and assembled floor elements superposed upon and adhering to said cushion layer.

4. A cushioned floor comprising, in combination: a subfloor; a cushioning layer comprising a relatively large portion of comminuted elastic material and a smaller portion of asphaltic material mixed therewith adhering to said subfloor; a layer comprising a smaller proportion of cushioning material mixed with asphaltic material adhering to said first named layer; and assembled floor elements superposed on and adhering to the last named layer.

5. The process of laying a floor which comprises: applying to a subfloor a layer of permanently ductile adhesive combined with a large proportion of comminuted resilient material; exposing said layer to the atmosphere for a period of time to permit partial curing; applying thereover an adhesive layer of permanently ductile adhesive combined with a smaller proportion of comminuted resilient material; and bedding the floor elements on said last named layer.

6. A cushioned floor comprising, in combination: a subfloor; an adhesive cushioning layer adhering to said subfloor; assembled floor elements superposed on and adhering to said cushioning layer; certain of said elements having aligned grooves in their lower surfaces to provide conduits to receive electrical conductors lying upon said layer.

7. A pre-fabricated floor element comprising, in combination: a plurality of slats secured together; the joints between said slats formed with internal recesses closely adjacent the bottom surface of the element; the lower edges of said recesses substantially in contact with the adjacent element whereby to substantially close the bottoms of the recesses; said element adapted to be laid upon an adhesive mastic layer without said recesses becoming normally filled with the mastic of the layer.

8. A pre-fabricated floor element comprising, in combination: a plurality of slats secured together; the internal joints between said slats formed with internal recesses produced by a groove formed in the edge of at least one of the meeting slats closely adjacent the bottom surfaces of the slats; the walls of said grooves meeting said bottom surfaces at a narrow edge substantially in contact with the opposed edge at each joint; said element adapted to be laid upon an adhesive mastic layer without said recesses becoming normally filled with the mastic of the layer.

9. A floor comprising, in combination: a subfloor; a layer of adhesive, permanently ductile and resilient mastic adhering to said subfloor, a floor panel superposed on and adhering to said mastic layer; said panel comprising wooden elements, certain of said elements spaced apart by interposed bodies of compressible and resilient material.

10. A prefabricated floor element comprising, in combination: a plurality of substantially identical slats secured together, the joints between said slats formed with internal recesses closely adjacent the bottom surface of the element; a narrow vertical abutment between said slats below said recesses; and the sides and ends of said assembled element provided with spline grooves, with recesses below said spline grooves, and narrow abutments therebelow adapted to substantially contact like abutments on adjacent elements in a floor.

GEORGE FREEMAN STORM.